A. THOMPSON.
Land-Roller.

No. 16,195.

Patented Dec. 9, 1856.

UNITED STATES PATENT OFFICE.

ANSON THOMPSON, OF GLENS FALLS, NEW YORK.

IMPROVEMENT IN IMPLEMENTS FOR ROLLING SEEDS IN THE EARTH.

Specification forming part of Letters Patent No. 16,195, dated December 9, 1856.

*To all whom it may concern:*

Be it known that I, ANSON THOMPSON, of Glens Falls, in the county of Warren and State of New York, have invented a new and useful Improvement on Implements for Rolling Seeds in the Earth; and I do hereby declare that the following is a full, clear, and exact description of the same, reference being had to the annexed drawings, making a part of this specification, in which—

Figure 1:
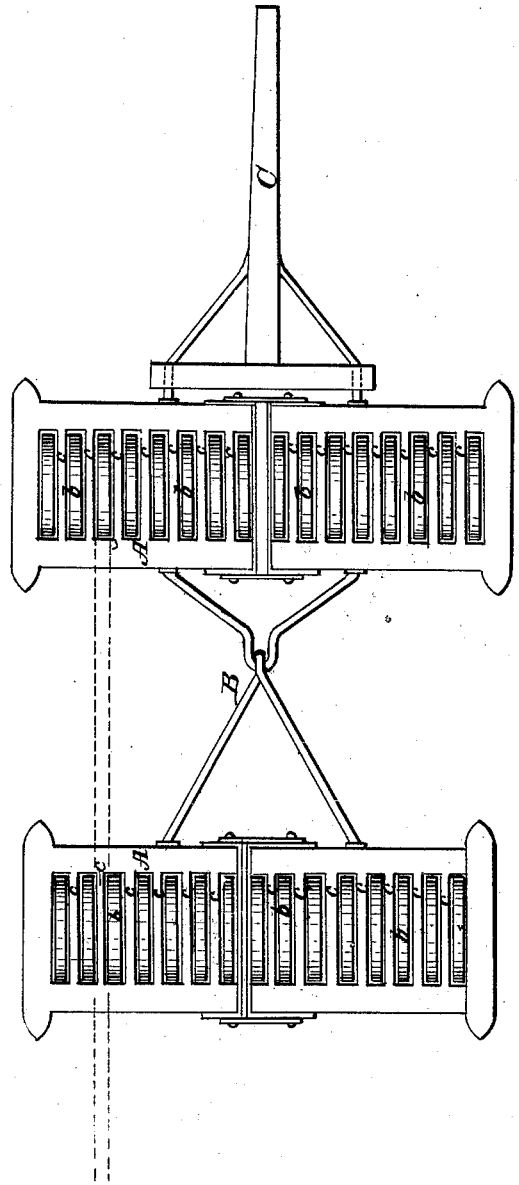
Figure 2:
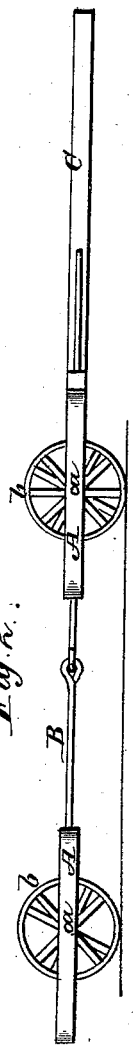

Figure 1 is a plan or top view of my improvement. Fig. 2 is a side view of the same.

Similar letters of reference indicate corresponding parts in the several figures.

To enable those skilled in the art to fully understand and construct my invention, I will proceed to describe it.

A A represent two frames of rectangular form, each of which is jointed at its center. To the under side of each frame there are attached two shafts, $a$ $a$, one at each side of the joint, and on these shafts there are placed wheels $b$, the rims of which are of a suitable width. The wheels are placed upon the shafts so that spaces are allowed between them equal to the width of the rims of the wheels and the upper part of the wheels work or are fitted between slats $c$ in the frames, as shown clearly in Fig. 1. The two frames A A are connected by a jointed reach, B, and a tongue or draft-pole, C, is attached to the front frame. The wheels $b$ of one frame are so placed upon their shafts as to be in line with the spaces between the wheels of the opposite frame. This will be understood by referring to the dotted lines in Fig. 1.

The implement is drawn over the field after the seed is sown, and the wheels of the front frame will sink into the soft earth and press the seed or grain therein a requisite distance, leaving ridges of unpressed earth between them, which ridges will be compressed by the wheels of the back frame as said wheels will be in line with the ridges. By this means the whole surface of the ground will be perfectly rolled and the seed or grain firmly embedded in the earth. The frame A being jointed allows the wheels to comform to the irregularities of the ground.

This implement is far superior to either of those now used for the same purpose. The drag merely throws a light covering of earth over the seed, and this light covering is often displaced by winds, leaving the seeds exposed.

The harrow covers portions of the seed too deep and other portions not at all, and leaves the field in an uneven state, full of small ridges. The roller does not press the seed firmly into the earth in consequence of its long bearing-surface, and if the ground is uneven many parts of it will be untouched.

By this machine or implement these difficulties are avoided, as the rims of the wheels being comparatively narrow they will sink a requisite distance into the earth, and as the wheels of one frame are in line with the spaces between the wheels of the other the whole surface will be perfectly rolled, more so than if one continuous roller were used, and with this advantage, that the earth is left with fine ridges sufficient to prevent the wind from acting upon the surface; but advantageous as is this arrangement of a fore-and-aft series of separated wheels, $b$, suitably hung in frames, which admit of the wheels accommodating themselves to irregularities of the ground, and the one series of wheels being arranged intermediate to the tread of the other or advance series, such arrangements have heretofore been very restricted in their use and altogether unsuited to many kinds of soil, owing to defects in the general construction of the implement, and this more especially so on damp ground and on clayey or sticky soil, by reason of the narrow spaces between the wheels $b$ becoming clogged or choked with adhering soil, and not only soil but seed, the many edges of the wheels readily separating the soil into narrow strips or pieces of insufficient weight to fall back, (as they do in the ordinary long roller,) which, easily adhering, get wedged into the spaces between the wheels and are carried round therein, thereby greatly obstructing the free run of the implement and impairing its action, the narrow wheels $b$ on their peripheries also occasionally lifting the seed and soil. Accordingly, though more perfect in theory than any of the implements in common use for embedding and covering the seed, such an arrangement of a double set of wheels, as described, has never been generally adopted; but my construction of the implement avoids its defects and renders it practicable for all kinds of soil and damp or dry conditions of the ground, the slatted frames A, between the slats $c$ of which the wheels $b$ work, serving most effectually to remedy the defect above mentioned by reason of the slots $c$, arranged as described, acting as scrapers to every wheel on both sides of it to prevent the collection of dirt between the wheels and, by the slats intersecting the wheels at or about their middle horizontally, serving to detach any uplifted earth from the peripheries of the wheels on their rising side at points where such detachment is most easily and naturally made.

The slats $c$ also break or crumble smalls clods brought up in contact with them by the wheels, showering the earth so broken, advantageously so, over the seed in the ground, and the wheels and their intervening spaces always being kept clear of adhering soil, the implement is kept free from clogging and runs smooth and easy over the ground.

I do not claim therefore separately of itself either a jointed roller-frame or two sets of rollers with the one set in advance of the other and the rear set following in the spaces untrodden by the forward set. Neither do I claim a roller made up of a series of wheels arranged parallel to each other at a suitable distance apart and hung so as to rotate separately of each other; but What I do claim as new and useful herein, and desire to secure by Letters Patent, is—

The combination, with the two series of separately-revolving wheels or narrow rollers $b\ b$, arranged (the several rollers and each series) relatively to each other, as specified, of the frames A A, constructed of slats $c$, arranged, as described, for operation in connection with the wheels, as herein set forth.

ANSON THOMPSON.

Witnesses:
S. H. WALES,
WM. TUSCH.